June 7, 1932.  A. P. PETRE  1,861,716
PISTON RING
Filed Dec. 20, 1930    2 Sheets-Sheet 1
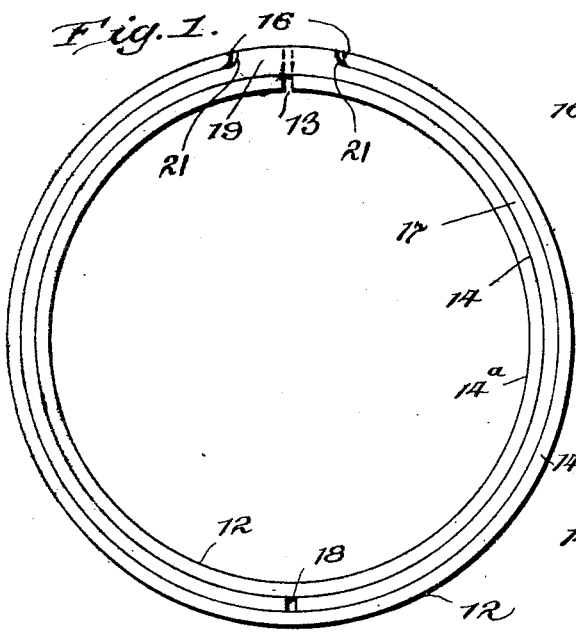
Fig. 1.
Fig. 2.
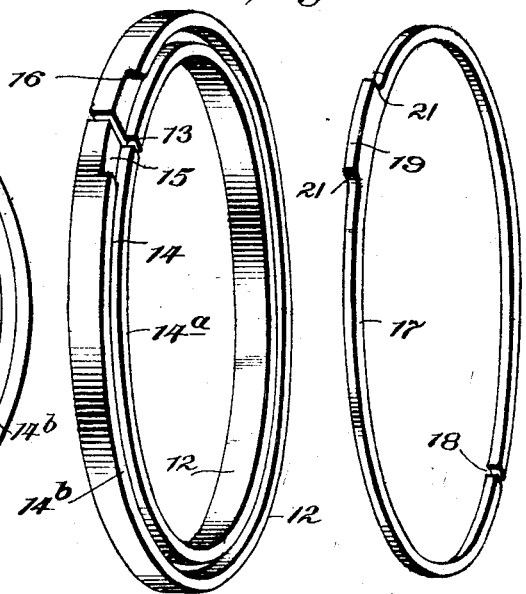
Fig. 3.
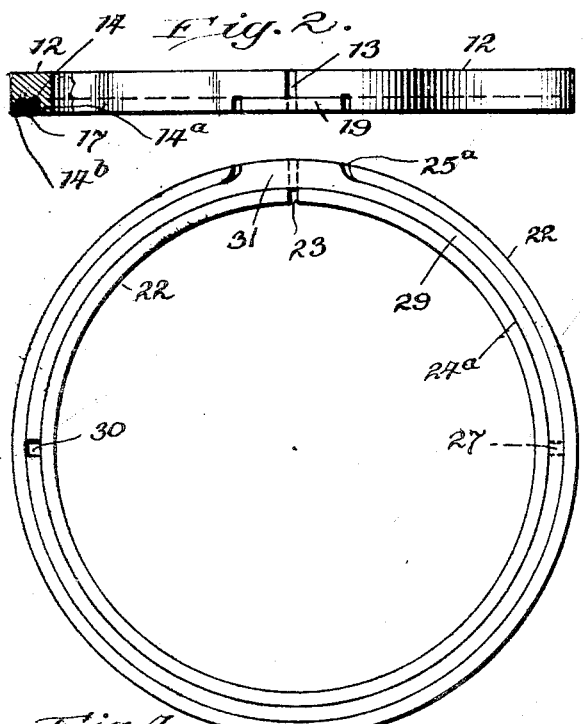
Fig. 4.
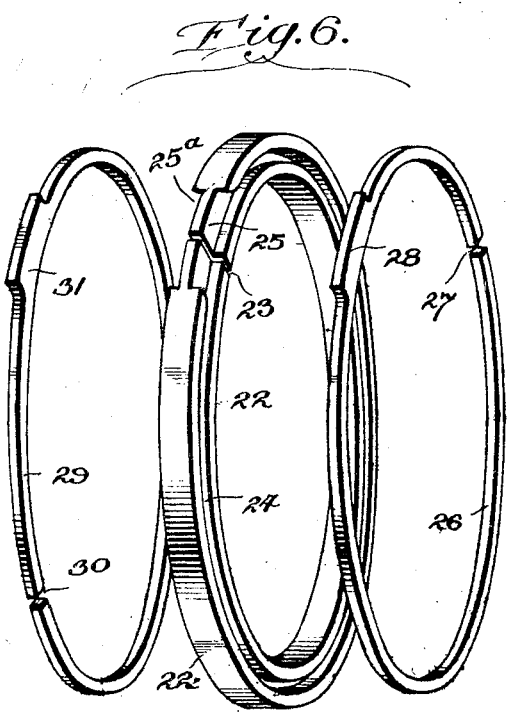
Fig. 6.
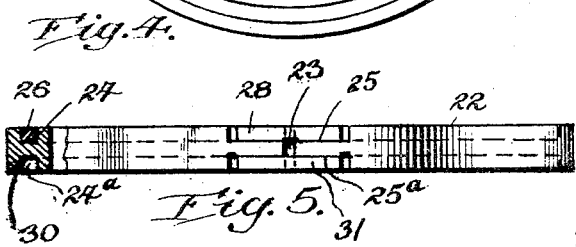
Fig. 5.
Inventor:
Alexander P. Petre,
By Dodge and Sons,
Attorneys June 7, 1932.  A. P. PETRE  1,861,716
PISTON RING
Filed Dec. 20, 1930  2 Sheets-Sheet 2
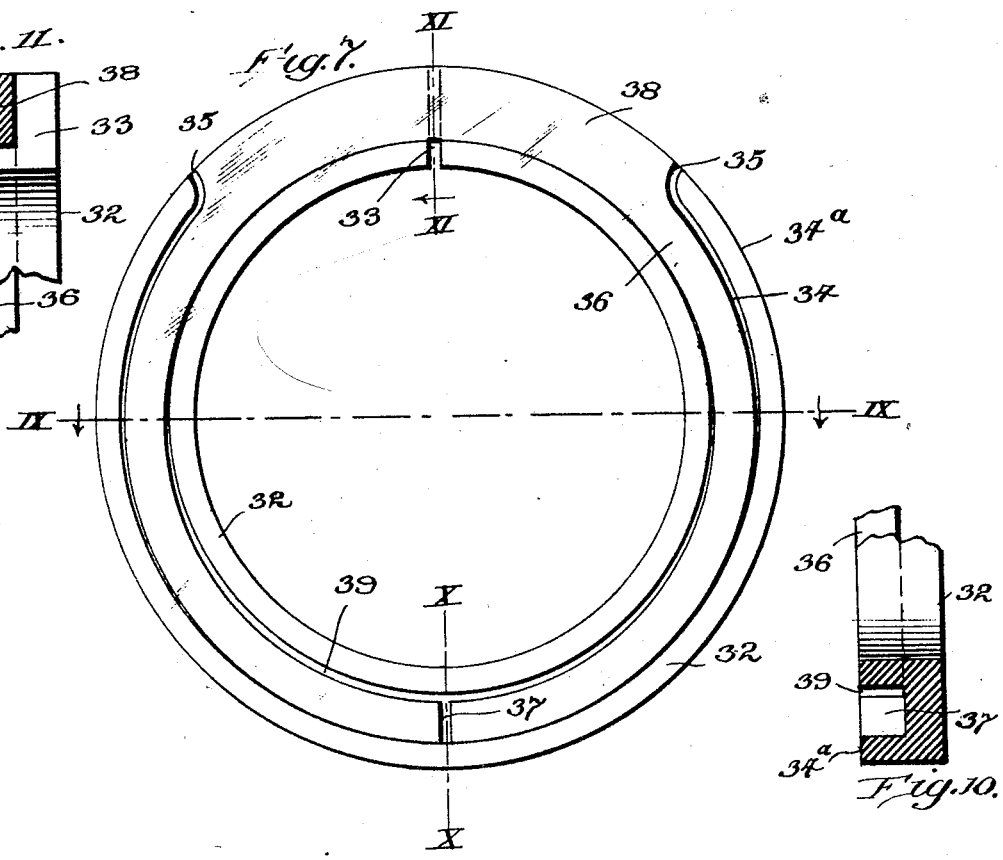
Inventor:
Alexander P. Petre, Patented June 7, 1932

1,861,716

UNITED STATES PATENT OFFICE

ALEXANDER P. PETRE, OF BALTIMORE, MARYLAND, ASSIGNOR TO THE AMERICAN HAMMERED PISTON RING COMPANY, OF BALTIMORE, MARYLAND, A CORPORATION OF MARYLAND

PISTON RING

Application filed December 20, 1930. Serial No. 503,843.

This invention relates to piston rings and particularly to small rings made up of two parts. More particularly, the ring comprises a split ring having a groove between its inner and outer faces, and a small split ring placed within the groove and protected by the outer ring.

One object of my invention is to produce a structure in which the expansion of an outer ring is limited by an inner ring when gas pressure gets behind the rings tending to expand them against the cylinder wall.

Another object of my invention is to provide a ring for use in two-cycle engines having ports in the cylinder walls.

Another object of the invention is to provide a two-part ring in which a member on one of the rings not only seals the joint of the other ring, but also prevents the joints in the two rings from lining up.

Other objects will appear from the following description when read in conjunction with the accompanying drawings in which:

Fig. 1 is a plan view of one form of ring embodying my invention;

Fig. 2 is a side view of the ring shown in Fig. 1, with a section removed to show the position of the parts in assembled relation;

Fig. 3 is a perspective view with the parts disassembled to show the component parts;

Fig. 4 is a plan view of a modified form of ring in which two insert rings are employed;

Fig. 5 is a side view of the ring shown in Fig. 4, a section being removed to show how the rings fit together.

Fig. 6 is a perspective view of the modified ring, showing the parts disassembled;

Fig. 7 is a plan view of a further modified ring in which the interfitting lug and notch are increased in size;

Fig. 8 is a side view of the ring shown in Fig. 7;

Fig. 9 is a section on line IX—IX of Fig. 7;

Fig. 10 is a section on line X—X of Fig. 7; and

Fig. 11 is a section on line XI—XI of Fig. 7.

Referring to the drawings, the reference character 12 designates an expanding ring, split at 13 and having between its inner and outer faces a groove 14. As here shown, the groove 14 extends entirely around the ring and the inner wall 14a of this groove is continuous, except for the break at the split 13. The outer wall 14b of this groove, however, is cut away at 15 to form a notch in registry with the split 13, and extending for a short distance each side of this split. The free ends of wall 14b adjacent to the notch 15 are rounded off slightly at 16.

The ring 12 because of its split is given tension so that it tends to expand within the cylinder wall and to contact closely with such wall. Upon expansion, however, the split 13 is opened slightly and if this ring were used alone in a piston groove, gas leakage would take place through this split. Furthermore, gas pressure would get behind the ring within the groove and further expand it, thereby producing objectionable friction with the cylinder wall.

In order to limit the expansion of the ring 12 and to seal the split 13 in this ring, I provide an insert ring 17. This ring is of relatively small cross section and is split at 18. In spaced relation to the split 18 is a peripheral lug 19 which, as here shown, is formed integral with the ring 17. The cross section of ring 17 is such as to allow it to fit entirely within the groove 14 of ring 12, and the lug 19 fits into the notch 15 and bridges the split 13 in the outer ring. The ends of lug 19 may be suitably rounded at 21 to produce a loose fit with the ends 16 of the outer wall of the groove, but to allow a limited amount of relative movement between the two rings.

In use, it is preferable to so proportion the tension of the two rings that when they are assembled and placed within a cylinder wall, the ring 17 will exert a restraining action on the outer ring and prevent it from producing excess pressure against the cylinder wall. When the two rings are assembled, as shown in Fig. 2, the insert ring 17 rests entirely within the groove 14 and is thereby protected against breakage, since it contacts with the cylinder wall only at the outer face of lug 19. This protection is important because the ring 17 is of small cross section and is not capable of withstanding large stresses. In rings of this general type, heretofore known, the insert ring has not been thus protected, and hence these rings have been subject to frequent breakage, with the resulting annoyance of frequent disassembly of the motors in which they were used. This improved ring not only avoids such disassembly, but renders frequent replacement unnecessary and enables a single ring to perform the three functions of limiting the expansion of the outer ring, sealing the joint in this ring, and preventing the ring joints from lining up.

A modified form of ring shown in Figs. 4, 5, and 6 embodies all of the features just described in connection with the ring shown in Figs. 1, 2, and 3, but the outer ring contains two grooves, in each of which is disposed an insert ring.

Referring to Fig. 6, the reference character 22 designates the modified form of ring which is split at 23 and contains annular grooves 24 and 24a in its opposite flat faces. As in the construction previously described, the groove 24 contains a notch 25 and the groove 24a contains a notch 25a. The groove 24 is adapted to receive an insert ring 26 having a split 27 and a peripheral lug 28, the lug 28 being adapted to project into the notch 25 of groove 24 when the two rings are assembled. The groove 24a is likewise adapted to receive an insert ring 29 having a split 30 and a peripheral lug 31, which lug registers with and projects into the notch 25a when the ring is placed in the groove 24a. It will be noted that the three splits 23, 27, and 30 are angularly displaced with respect to one another so as to prevent any possibility of gas pressure escaping through the joints. The joint 23 in the outer ring is protected from leakage on both sides by the lugs 28 and 31. This ring possesses all the advantages previously set forth, and in addition produces a more effective sealing of the piston due to the presence of two lugs 28 and 31 on opposite sides of the split 23 in the outer ring 22. Also, the two rings 26 and 29 act together to produce a greater restraining action on the outer ring than could be obtained by the use of a single insert ring, thus producing a more rigid ring and one capable of withstanding high gas pressures without excessive expansion.

One application to which this ring is of particular use is in two-cycle engines in which the cylinder walls contain inlet and exhaust ports. In engines of this character having a small cylinder bore requiring small rings, the mode of operation is such that the use of a two-part ring is desirable in order to limit the pressure of the ring against the cylinder wall. One form of ring which I have found to be very satisfactory for this purpose is that shown in Figs. 7 to 11.

Referring now to Fig. 7, the reference character 32 designates an expanding ring having a split 33. This ring contains an annular groove 34 between its inner and outer faces, and having its outer wall 34a interrupted for a substantial distance on either side of the split 33 to form a wide notch 35 of greater width than that of the usual cylinder port. Disposed within the groove 34 and entirely protected by the outer ring is an insert ring 36 containing a split 37 and having a peripheral lug 38. The lug 38 is of substantial circumferential extent, and is adapted to fit into and cooperate with the notch 35 in outer ring 32. As shown, the ring 36 is so placed within the groove 34 as to leave clearance 39 between the inner wall of the groove and the inner face of the insert ring. This clearance is shown to indicate that the insert ring does not entirely fill the groove 34, but is so located therein as to permit limited relative movement in a radial direction between the two rings. This clearance is so proportioned, in the manufacture of the ring, that gas pressure getting behind the ring as a whole, cannot cause the outer ring to press too tightly against the cylinder wall, this pressure being limited by the restraining action of the insert ring.

Inasmuch as the lug 38 on insert ring 36 is of considerable extent circumferentially, it will pass over and bridge the ports in a cylinder wall, and will prevent engagement of the joints of the outer ring with the edges of such ports, and substantially eliminate breakage from this cause. This modified form of ring not only embodies all the advantages of the rings heretofore described, but has the additional function of preventing the rings from catching in the edges of cylinder ports, and thereby causing breakage. It is obvious that the use of rings of this type is not limited to small rings.

Although I have herein shown and described only a few forms of piston rings embodying my invention, it will be obvious that various changes may be made, within the scope of the claims, without departing from the spirit and scope of my invention.

What is claimed is:

1. A piston ring comprising a split ring having a groove between its inner and outer faces, and extending entirely around the ring, the outer wall of said groove being cut away at the ring joint; and a split insert ring seated in said groove, and having a peripheral lug projecting into the cut-away portion of the wall of said groove, said lug bridging the joint in the grooved ring.

2. A piston ring comprising a split ring having a pair of axially outward extending flanges, said flanges defining an annular channel in one of its flat faces, said channel extending entirely around the ring and communicating with a curved portion of the ring only by means of a notch in one wall of the channel, said notch being in registry with the ring joint; and a smaller split ring confined in said channel, and having a peripheral lug extending into said notch and bridging the joint in the channeled ring, the splits in said rings being angularly displaced.

3. A piston ring comprising a split ring having a groove concentric with and between its inner and outer faces, and extending entirely around the ring, the outer wall of said groove being cut away at the ring joint; and a smaller split ring seated in said groove and having a peripheral lug projecting into the cut-away portion of the wall of said groove, said lug bridging the joint in the grooved ring.

4. A piston ring comprising a split ring having a groove between its inner and outer faces, and extending entirely around the ring, the inner wall of said groove being interrupted only by the ring joint, and the outer wall of the groove being cut away at the ring joint through a substantial portion of the ring circumference; and a split ring seated in said groove, and having a peripheral lug projecting into and substantially filling the cut-away portion of the wall of said groove, said lug bridging the joint in the grooved ring.

5. A piston ring comprising a split ring having a groove in each of its flat faces and spaced from the inner and outer faces of the ring, said groove extending entirely around the ring, the outer wall of each groove being cut away at the ring joint; and a split insert ring seated in each of said grooves, each insert ring having a peripheral lug projecting into the cut-away portion of the wall of the groove in which it rests, each said lug bridging the joint in the grooved ring.

6. A piston ring comprising a split ring, U-shaped in cross section, and having a notch in one side wall of the U groove, said notch registering with the ring joint; and a small split ring disposed within the groove, said small ring having a peripheral lug projecting into the notch and bridging the joint of the U-ring, the joints in the two rings being angularly displaced relatively.

In testimony whereof I have signed my name to this specification.

ALEXANDER P. PETRE.